Jan. 20, 1953          E. T. WILBUR          2,626,350

PANORAMIC RECEIVER

Filed Oct. 12, 1944

INVENTOR.
EVERETT T. WILBUR
BY
William D. Hall.
ATTORNEY

Patented Jan. 20, 1953

2,626,350

UNITED STATES PATENT OFFICE 2,626,350

PANORAMIC RECEIVER

Everett T. Wilbur, Dayton, Ohio

Application October 12, 1944, Serial No. 558,444

9 Claims. (Cl. 250—20)

(Granted under Title 35, U. S. Code (1952), sec. 266)

The invention described herein may be manufactured and used by or for the Government for governmental purposes, without the payment to me of any royalty thereon.

This invention pertains to sweep circuit arrangements for oscilloscopes employed in connection with panoramic receivers.

In panoramic receiver circuits, the output of the receiver is connected to the vertical deflection plates of a cathode ray tube and the receiver resonant frequency is tuned thruout its operating range. Concurrent with the variation in receiver frequency, a sweep voltage serves to deflect the cathode ray beam horizontally so that the cathode ray tube displays simultaneously and individually, all of the signals that are present in the operating band of the receiver.

Heretofore, gas tube sweep circuits have been used to generate the sweep voltages that have been fed to the cathode ray tubes associated with panoramic receivers. The voltages generated by such circuits have been subject to irregularities that are characteristic of systems using gas tubes. These irregularities are commonly referred to in the art as "jitter."

The objects of the present invention include the provision of an improved sweep circuit arrangement that provides a sweep voltage that has a superiority in wave form over the sweep voltage that can be obtained by the use of gas tubes; the provision of a sweep voltage for panoramic reception which is substantially free from jitters or lateral instability, which faults have been inherent in thyratron or other triggered circuits where the jitters are due to the absence of a constant relationship between the sweep voltages and the frequency to which the receiver is tuned; the provision of a sweep synchronizing circuit which consists basically of a method of obtaining an improved sweep voltage having an amplitude that is dependent at any instant upon the frequency of the output of a sweeping oscillator; the provision of a panoramic presentation that is free from variations in pip positions which are due to transient mechanical considerations, and that is free from double pips that are caused by variations in condenser plate constructions; the provision of an improved panoramic device that avoids the disadvantage of the large space that has been required heretofore for straight line frequency condensers; the provision of a sweep voltage that varies only with relative condenser plate positions and wherein variations in motor speed do not objectionably affect the amplitude of the sweep, which avoids the necessity of resetting amplitude controls while the device is in operation; and the provision of a device wherein all four cycles of a split stator condenser rotation can be used and wherein the designer can control the relative trace and scanner frequency positions thruout the entire scanning cycle whereas with a gas tube sweep it is possible to control only the initiation of the sweep.

With the above and other objects in view which will be apparent to those who are familiar with the field of endeavor to which the present invention pertains, an illustrative embodiment of the present invention is shown in the accompanying drawing wherein.

Figure 1:
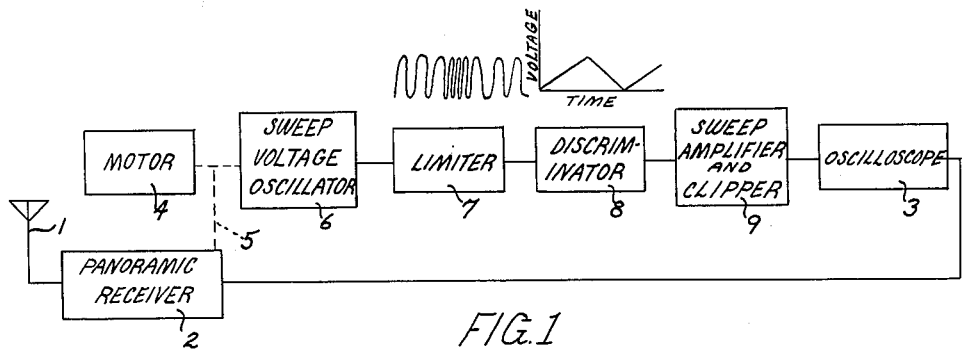
Fig. 1 is a block diagram of a circuit that embodies the present invention.
Figure 2:
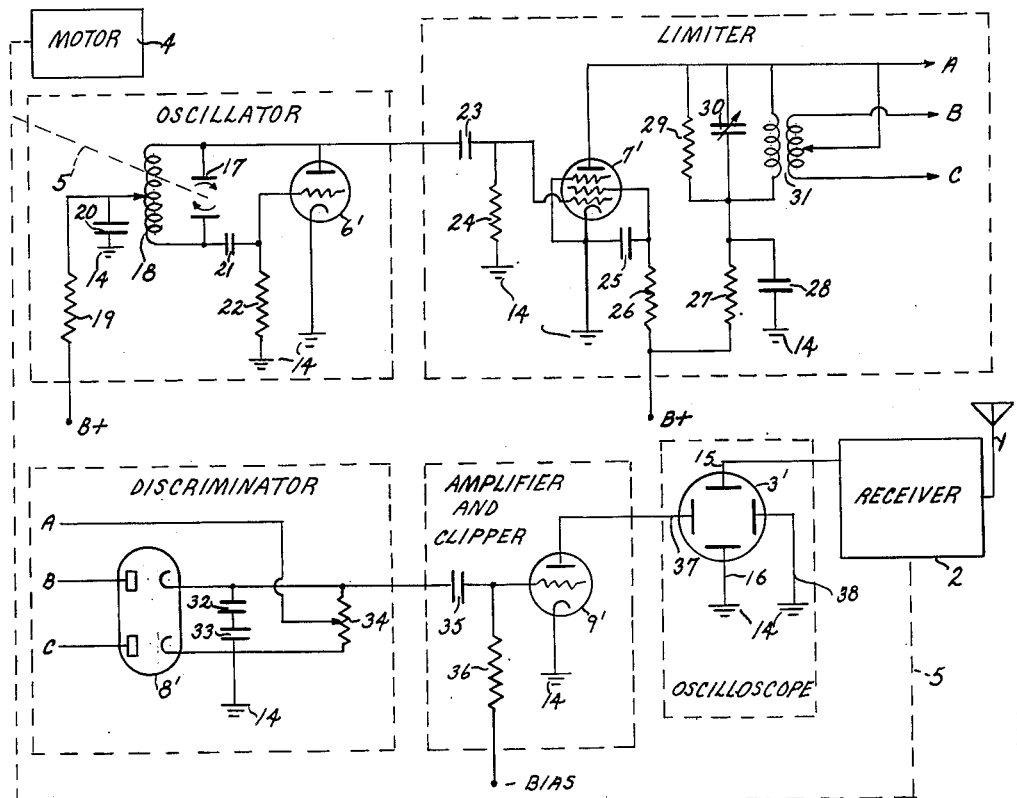
Fig. 2 is a circuit diagram of the novel parts of the circuit that is shown in Fig. 1.

The present invention embodies a method of using a portion of a scanning oscillator output to produce a sweep wave form that is synchronized with the tuning of a panoramic receiver. The oscillator feeds into a circuit to produce a voltage the amplitude of which varies with the frequency of the scanning oscillator voltage. Condenser plates can be so cut as to obtain any desired ratio of frequency to displacement characteristics.

As the panoramic receiver sweeps or scans thru a band of various frequencies, the frequency of the sweep oscillator will vary from a given minimum to a given maximum. The frequency modulated voltage is used to actuate a circuit the amplitude of whose output voltage is proportional to the frequency of its input voltage. An output voltage is thereby secured which will be proportional to the frequency of the oscillator, and thus to the condenser displacement of the panoramic receiver tuned circuits, which is the requisite condition for panoramic reception.

In the accompanying drawing, radio energy that is intercepted by an antenna 1 is conducted thru preferably a panoramic receiver 2 and then resolved into a panoramic presentation that appears as a trace upon a screen portion of a cathode ray tube that forms a part of an oscilloscope 3. A motor 4, thru a dotted power line 5, continuously turns rotor condenser plates in both the panoramic receiver 2 and in a sweep voltage frequency modulated oscillator 6 that feeds a generated wave thru a limiter 7, discriminator 8, and sweep amplifier and clipper 9, so that the generated wave is also impressed upon the same cathode ray tube and presented upon the same screen of the oscilloscope 3 upon which the intercepted radio energy appears. The limiter 7 maintains the output of the oscillator 6 at an even level and feeds into the discriminator 8 which functions to demodulate the generated wave and to provide a sawtooth wave whose voltage-time components are shown above the block that designates the discriminator 8 in the drawing. The output of the discriminator 8 varies with the frequency deviation of the oscillator 6 and is fed to the sweep amplifier and clipper 9 from which it is fed into the oscilloscope 3.

In the circuit diagram that conforms with the above described block diagram, the cell components are designated by primed numerals that conform with the unprimed numerals that designate the block diagram units for ready association therewith.

In the circuit diagram, the antenna 1 feeds intercepted radio energy to the receiver 2 which impresses the intercepted energy upon one horizontal plate 15 of a cathode ray tube 3' of the oscilloscope 3, to impart vertical signal pip deflections to the trace thereon. The other horizontal plate 16 of the cathode ray tube 3' is grounded. The motor 4, thru the dotted drive 5 rotates variable condenser plates in both the receiver 2 and in the variable condenser 17 that is disposed within the oscillator unit 6 of the circuit.

In the oscillator unit 6, the continuously variable condenser 17 is shunted by and continuously tunes an inductor 18 that is adjustably tapped thru a decoupling resistor 19 to the positive post of a "B" battery past a fixed by-pass condenser 20 that passes R. F. to ground 14. One of the stationary plates of the variable condenser 17 is connected to the plate of an oscillator triode 6' and the other fixed plate of the condenser 17 feeds thru a fixed condenser 21 to a divided connector, part going to the grid of the triode 6' and part going thru the resistor 22 to ground 14. The cathode of the triode 6' is grounded.

The plate current from the oscillator triode 6' is fed thru a series fixed condenser 23 and past a ground resistor 24 to the grid of a limiter pentode cell 7'. The pentode 7' cathode is grounded. The suppressor grid of the pentode 7' is connected to the cathode of the cell 7' and fixed condenser 25, in parallel with a conductor from the screen grid of the cell 7' thru a resistor 26 to the positive post of the "B" battery. The same positive post of the "B" battery is also connected thru a decoupling resistor 27, where radio frequency is bypassed thru a condenser 28 to ground 14, and where the feed is branched in parallel thru a resistor 29, a variable condenser 30 and the primary winding of a transformer 31 that is tuned by the condenser 30, all of which connect to the plate circuit from the limiter cell 7'. The secondary winding of the transformer 31 is adjustably tapped into the plate circuit from the limiter cell 7', and its opposite ends are connected to the two plates of a discriminator twin diode 8.

The cathodes of the cell 8' are shunted by a pair of condensers 32 and 33 that continue to ground 14, and the conductors from the cathode of the cell 8' are thereafter shunted by a resistor 34 that is adjustably tapped by a terminal contact from the plate circuit of the limiter cell 7'.

The outlet from the resistor 34 continues thru a fixed condenser 35 past a negative bias resistor 36, to the grid of an amplifier and clipper cell 9'. The cathode of the cell 9' is grounded and the plate of the cell 9' is applied to one of the vertically disposed plates 37 of the cathode ray tube 3' within the oscilloscope 3 to provide a horizontal trace therefor. The other vertically disposed plate 38 of the tube 10 is grounded to 14.

In operation, electrical energy that is intercepted by the antenna 1 feeds thru the receiver 2 and is applied thru the horizontal plates 15 and 16 of the cathode ray tube 3' to ground and provides vertical deflections, or pips, of the horizontal trace that is impressed upon the screen of the cathode ray tube 3'. An improved horizontal trace is maintained upon the screen of the cathode ray tube 3' by the described circuit that impresses its wave upon the vertical plates 37 and 38 of the cathode ray tube 3'.

The circuit uses the sine wave oscillator 6 that contains the tuning condenser 17 that is rotated synchronously with a tuning condenser, not shown, within the panoramic receiver 2. As the panoramic receiver 2 sweeps or scans thru its frequency range, the frequency of the oscillator 6 will vary from a given minimum to a given maximum, as indicated by the curve above the limiter block 7 in Fig. 1 of the accompanying drawing. The same voltage is used to actuate a circuit the amplitude of whose output voltage is proportional to the frequency of its input voltage. The voltage and time relation is indicated above the block that represents the discriminator 8 in Fig. 1 of the drawing. An output voltage is thereby obtained which will be proportional to the frequency of the oscillator 6 and thus to the displacement of the panoramic receiver tuning condenser to which the oscillator 6 is mechanically synchronized which is the requisite condition for panoramic reception.

The oscillator 6 presents a voltage whose frequency varies thruout the sweep range at a rate that corresponds with the shape characteristic of the plates of the condenser 17 part of the oscillator 6. The most desirable characteristic is that of straight line frequency as compared with the position of the trace upon the screen of the cathode ray tube 3', although other frequency characteristics may be used to conserve space. The circuit that is shown herein has improved functional advantages over the conventional thyratron sweep circuit.

The circuit that is disclosed herein provides a sweep voltage that has an amplitude that is dependent at any instant upon the frequency of the output of the sweeping oscillator 6. The voltage amplitude is independent of motor speed. The motor driven condenser 17 is synchronized with tuned radio frequency circuits within the panoramic receiver 2 that preferably, but not necessarily is of the superheterodyne type in which case a scanning oscillator, not shown, a mixer or the like, will be required.

The output of the oscillator 6 comprises a radio frequency voltage that varies in frequency in conformity with the positions of the plates of the continuously variable condenser 17. This frequency modulated signal, that is indicated above the block that represents the limiter 7 in the accompanying drawing, is then impressed upon the limiter 7 and from the limiter 7 upon the discriminator 8.

The output of the discriminator 8 will vary in conformity with the positions of the condenser 17. The amplified voltage will possess the characteristic of varying only with the positions of the plates of the condenser 17. This characteristic reduces or effectually eliminates the jitter objection that is usually characteristic of gas tube sweeps. This circuit also is characterized by the fact that variations in the speed of the motor 4 will not so alter the amplitude of the sweep as to necessitate the resetting of the amplitude controls. The circuit has the further advantage that all four cycles of a split-stator condenser rotation can be used since the circuit provides means for controlling the relative trace and scanner frequency positions thruout the entire scanning cycle. With a gas tube sweep it is possible to control only the initiation of the sweep. If preferred, a filtered and rectified output of a tapped off portion of the scanning oscillator output may be used. The sweep voltage will then be dependent upon the frequency response characteristics of a selective filter.

The circuit that is shown and described herein has the stated advantages and improvements over related circuits that have been used heretofore for similar purposes.

It is to be understood that the particular assembly of components, filter arrangements and inductance-capacitance associations that have been shown and described herein, have been presented for the purposes of illustrating and describing successfully operating embodiments of the present invention and that various satisfactory alterations, modifications and substitutions may be made herein without departing from the present invention as defined by the appended claims.

What I claim is:

1. A system comprising a tunable receiver, means for presenting a visual indication of the signals received by said receiver comprising a cathode ray oscilloscope, a variable frequency oscillator, means for varying the frequency of said oscillator synchronously with the receiver tuning, means for producing a voltage the amplitude of which is proportional to the frequency deviation of said oscillator from a predetermined frequency, and means for applying said voltage as a sweep voltage for said cathode ray oscilloscope.

2. In a panoramic receiver having a cathode ray tube indicating means, means for producing a synchronized sweep voltage for said indicator comprising an oscillator, means for tuning said oscillator over a predetermined band of frequencies, means for synchronizing the tuning of said oscillator with the tuning of said receiver, and means comprising a limiter and discriminator for deriving from said oscillator output a sweep voltage the amplitude of which is proportional to the frequency displacement of said oscillator relative to a predetermined frequency in said band.

3. In a panoramic receiver having a cathode ray tube indicating means, means for producing a synchronized sweep voltage for said indicator comprising an oscillator, means for tuning said oscillator over a predetermined band of frequencies, means for synchronizing the tuning of said oscillator with the tuning of said receiver, and means for deriving from said oscillator output a sweep voltage the amplitude of which is proportional to the frequency deviation of said oscillator with respect to one edge of said band.

4. A panoramic system for reception of signals extending over a given frequency spectrum, comprising a band pass circuit having a pass band which is narrower than said given spectrum, a first tuning means for varying the frequency position of said pass band in said spectrum over at least a portion of said spectrum, means for generating oscillations, a second tuning means for varying the frequency of said oscillations, an indicator for indicating the frequency content of said spectrum against a frequency representative base line, frequency discriminator network means responsive to said oscillations for controlling said indicator to establish said frequency representative base line thereon, and means for synchronously actuating said first and second tuning means.

5. A panoramic device for analyzing signals relatively displaced in a predetermined frequency spectrum, comprising, a superheterodyne receiver comprising a frequency-modulated heterodyning signal source for scanning said spectrum to enable receiving of said first mentioned signals successively, means responsive to said receiver for indicating the relative locations of said signals in the said spectrum against a frequency representative base line, a frequency-modulated oscillator for providing frequency-modulated sweep signals, frequency discriminator means for detecting said sweep signals, means responsive to the output of said discriminator means for generating said base line, and means for synchronizing the frequency modulation of said signal source and said oscillator.

6. A panoramic device for analyzing signals relatively displaced in a predetermined frequency spectrum, comprising, a superheterodyne receiver having a signal source, means responsive to the output of said receiver for indicating the relative locations of said signals in the said spectrum against a frequency-representative base line, a second signal source, means for synchronously frequency modulating both of said signal sources, frequency discriminator means for detecting the frequency modulation of said second signal source, and means responsive to the output of said discriminator means for generating said base line.

7. A panoramic device for analyzing the frequencies of waves relatively displaced in a predetermined frequency spectrum, comprising means for generating a pair of signals, means for synchronously modulating the frequencies of said signals, means for heterodyning said waves with one of the frequency modulated signals for successively converting said waves to a fixed frequency, and means responsive to said fixed frequency for indicating the relative locations of said signals in the said spectrum against a frequency representative base line, said last-named means including frequency discriminator means responsive to the other of the frequency modulated signals for providing an instantaneous output which is proportional to the instantaneous frequency of said other signals, and means responsive to said output for generating said base line.

8. A panoramic system of signal reception of signals extending over a relatively wide frequency spectrum, comprising, a band pass circuit having a relatively narrow instantaneous pass band, means for varying the frequency position of said pass band in said spectrum over at least a portion of said spectrum, said last means comprising a first variable capacitor, means for generating oscillations, means for modulating the frequency of said oscillations over a frequency spectrum, said last means comprising a second variable capacitor, an indicator for indicating the frequency content of said spectrum against a frequency representative base line, frequency discriminator network means responsive to said oscillations for controlling said indicator to establish said frequency representative base line thereon, and means for synchronously actuating said first and second variable capacitors.

9. In a panoramic device for analyzing signals relatively displaced in a predetermined frequency spectrum, a superheterodyne receiver comprising a frequency modulated heterodyning signal source having a predetermined total frequency deviation for scanning said spectrum to enable receiving of said first-mentioned signals successively, said frequency modulated heterodyning signal source comprising a tuning means, means responsive to said receiver for indicating the relative locations of said signals in the said spectrum against a base line, means for providing frequency modulated sweep signals comprising an oscillator having a tuning means, frequency discriminator means for detecting said sweep signals, means responsive to the output of said discriminator means for providing base line generating sweep voltage for said means for indicating, and means for synchronously actuating both of said tuning means.

EVERETT T. WILBUR.

REFERENCES CITED

The following references are of record in the file of this patent:

UNITED STATES PATENTS

| Number | Name | Date |
|---|---|---|
| 1,936,796 | Legg | Nov. 28, 1933 |
| 1,994,232 | Schuck, Jr. | Mar. 12, 1935 |
| 2,084,760 | Beverage | June 22, 1937 |
| 2,130,032 | Robins | Sept. 13, 1938 |
| 2,130,913 | Tolson | Sept. 20, 1938 |
| 2,162,827 | Schrader | June 20, 1939 |
| 2,215,197 | Sherman | Sept. 17, 1940 |
| 2,273,914 | Wallace | Feb. 24, 1942 |
| 2,303,214 | Labin et al. | Nov. 24, 1942 |
| 2,387,685 | Sanders | Oct. 23, 1945 |

FOREIGN PATENTS

| Number | Country | Date |
|---|---|---|
| 113,637 | Australia | Aug. 21, 1941 |
| 465,461 | Great Britain | Apr. 29, 1937 |

OTHER REFERENCES

Panoramic Principles by W. E. Moulic, Electronic Industries, July 1944. Pages 86–88 and 106.

Panoramic Radio Reception by J. R. Popkin-Clurman, Radio, March 1942, pages 15 to 18 and 46 to 49.